United States Patent [19]

Ulrich

[11] Patent Number: 5,566,248
[45] Date of Patent: Oct. 15, 1996

[54] METHOD AND APPARATUS FOR A RECOGNITION EDITOR AND ROUTINE INTERFACE FOR A COMPUTER SYSTEM

[75] Inventor: Robert R. Ulrich, Mountain View, Calif.

[73] Assignee: Apple Computer, Inc., Cupertino, Calif.

[21] Appl. No.: 590,620

[22] Filed: Jan. 24, 1996

Related U.S. Application Data

[63] Continuation of Ser. No. 60,439, May 10, 1993, abandoned.
[51] Int. Cl.$^6$ ............................. G06K 9/00; G06K 9/46
[52] U.S. Cl. ........................ 382/187; 382/188; 395/700; 364/705.03
[58] Field of Search ................................ 382/187, 188; 395/700; 364/705.03

[56] References Cited

U.S. PATENT DOCUMENTS

| Re. 34,476 | 12/1993 | Norwood | 382/13 |
|---|---|---|---|
| 4,112,415 | 9/1978 | Hilbrink | 340/146.3 |
| 4,972,496 | 11/1990 | Sklarew | 382/13 |
| 5,215,397 | 6/1993 | Taguchi et al. | 401/194 |
| 5,294,792 | 3/1994 | Lewis et al. | 382/13 X |
| 5,361,310 | 11/1994 | Ishigaki | 382/13 |

OTHER PUBLICATIONS

"Microsoft Windows for Pen Computing: Programmer's Reference" 1992, pp. 1–11, pp. 81–86, and pp. 180–189.
"Using Pen Point: PenPoint API Reference", 1991, pp. 500–523.
Car, Robert and Shafer, Dan, "The Power of PenPoint", 1991, pp. 225–239.
Steven, L, "Newton rising," Mcworld, V. 10, n. 2, pp. 77–80, Feb. 1993.
Paula, R., "Windows 3.0 Will handle pen input," EDN, v. 35, N. 18A, p3(2), Sep. 1990.

*Primary Examiner*—Raymond J. Bayerl
*Assistant Examiner*—A. Katbab
*Attorney, Agent, or Firm*—Hickman Beyer & Weaver

[57] ABSTRACT

A computer system including a CPU, a screen assembly coupled to the CPU, a pointer assembly coupled to the CPU, an application program running on the CPU, a recognizer routine running on the CPU, and a recognition editor and interface (REI) routine running on the CPU and providing an interface between the application program and the recognition routine. The REI routine is operative to display an interface image on the screen of the CPU, receive ink inputs made on the interface image by the pointer mechanism, send ink inputs to the recognition routine, receive recognized objects from the recognition routine, and to send recognized objects to the application program. Preferably, the REI routine also permits recognized objects to be edited on the interface image. By making the user interface of the REI routine separate from the operating system, the application program, and the recognition routine, a consistent user interface is developed for a multiplicity of application programs and recognition routines. A method for interfacing between an application program and a recognizer routine includes the steps of: 1) receiving user inputs from a pointing device into an interface routine; 2) sending the user inputs to a recognizer routine; 3) receiving into the interface routine recognized objects from the recognizer routine; and 4) sending the recognized objects to an application program from the interface routine. The method also preferably includes the step of editing the recognized objects before sending them to the application program.

22 Claims, 15 Drawing Sheets

METHOD AND APPARATUS FOR A RECOGNITION EDITOR AND ROUTINE INTERFACE FOR A COMPUTER SYSTEM

This is a continuation of application Ser. No. 08/060,439 filed May 10, 1993, now abandoned.

BACKGROUND OF THE INVENTION

This invention relates generally to computer systems, and more particularly to graphical user interfaces for computer systems.

Graphical user interfaces or GUI are becoming increasingly popular with computer users. It is generally accepted that computers having graphical user interfaces are easier to use, and that it is quicker to learn an application program in a GUI environment than in a non-GUI environment.

A relatively new type of computer which is well suited for graphical user environments is the pen-based or pen-aware computer system, hereinafter generically referred to as a "pen computer system", "pen computer", or the like. A pen-based computer system is typically a small, hand-held computer where the primary method for inputting data includes a "pen" or stylus. A pen-aware computer system is one which has been modified to accept pen inputs in addition to traditional input methods.

A pen computer system is typically housed in a relatively flat enclosure, and has a dual-function display assembly which serves as both an input device and an output device. When operating as an input device, the display assembly senses the position of the tip of a stylus on the viewing screen and provides this positional information to the computer's central processing unit (CPU). The display also senses whether the tip of the stylus is pressed against the screen. Some display assemblies can additionally sense the pressure of the stylus on the screen to provide further information to the CPU. When operating as an output device, the display assembly presents computer-generated images on the screen.

Typically, graphical images can be input into the pen computer systems by merely moving the stylus across the surface of the screen, i.e. by making a "stroke" on the screen. A stroke is defined as the engagement of the screen with a stylus (i.e. the stylus tip is pressed against the screen), the movement of the stylus across the screen (if any), and its subsequent disengagement from the screen (i.e. the stylus tip is lifted from the screen). While the stylus tip is pressed against the screen, the CPU senses the position and movement of the stylus and generates a corresponding image on the screen to create the illusion that the stylus is drawing the image directly upon the screen, i.e. that the stylus is "inking" an image on the screen. With suitable recognition software, text and numeric information can also be entered into the pen-based computer system in a similar fashion. Methods for recognizing the meaning of "ink" are well known to those skilled in the art.

Pen computers are designed such that they may be operated without an attached keyboard, using only a stylus for input. Most of the software written for pen computers is designed to function well with pen strokes and "tapping" the stylus against the computer screen in defined areas. A "tap" is defined as a stroke which is made at substantially one spot on the computer screen. Since the primary method for inputting information into a pen computer system comprises a stylus or other pointer mechanism, it is often necessary for the pen computer system to "recognize" ink-type input. For example, if a user writes the letters "C", "A", and "T" on the screen of the pen computer system using a stylus, it is desirable that the pen computer system be able to recognize these hand-inputs as the letters C, A, and T. Specialized computer programs known as "recognizers", "recognition engines", or "recognition routines" are used to convert ink-inputs to recognized objects.

There are many types of recognition routines. For example, there are recognition routines to recognize parts of characters, full characters, words, numbers, mathematical expressions, Kanji (Japanese language characters), etc. Recognizer routines are written by programmers who specialize in sophisticated mathematical algorithms for interpreting handwriting. However, these programmers typically have little experience in designing effective user interfaces. Because of this, recognizers are usually implemented as engine code ("recognition engine"), and it is up to the application program calling the recognition engine to create an interface for user input and for the correction of text. Since application programs are typically produced by a multiplicity of vendors, it is likely that each application program would have its own interface and editing model, resulting in inconsistencies between different applications. The result is a more cumbersome user interface which is harder to learn and which is more prone to errors.

Other pen computer systems take different approaches to providing a user interface for recognition routines. For example, the PenPoint operating system from GO Corporation of Foster City, Calif., provides a recognition interface which is part of its operating system. This has the desirable feature of providing a consistent user interface across all applications running under the PenPoint operating system. Unfortunately, making the user interface a part of the operating system limits the opportunity to provide customized interfaces, or to provide interfaces for a new type of recognition.

Microsoft Windows for Pen Computing (also commonly known as "Pen Windows") made by Microsoft, Inc. of Redmond, Wash., takes yet another approach. In the Pen Windows operating system, it is the recognizer routine itself which is responsible for the user interface. There are several problems with this approach, including the aforementioned problem that programmers skilled in the development of recognition routines tend not to be experts in the development of user interfaces. Furthermore, this system reduces flexibility because an application would have to be written with a particular recognizer routine in mind. Therefore, application developers may have to compromise in their selection of recognizer routines to find a recognizer routine that provides an adequate user interface as well as adequate recognition of ink-inputs.

SUMMARY OF THE INVENTION

The present invention provides an interface routine which is independent of the computer's operating system, any application program, and any of the recognizer routines. As such, the interface routine can provide a consistent user interface for a multiplicity of application programs, and allows the application program to select a desired recognition routine based solely upon the recognition abilities of that routine. Furthermore, this independent interface routine provides the editing functions for recognized inputs, thereby further promoting interface consistency.

A method for interfacing between an application program and a recognizer routine on a computer system in accordance with the present invention includes the steps of: 1)

receiving inputs from a pointing device into the interface routine; 2) sending the user inputs from the interface routine to a recognizer routine; 3) receiving by the interface routine recognized user inputs from the recognizer routine; and 4) sending the recognized user inputs to an application program from the interface routine. Preferably, the method of the present invention also includes the step of editing the recognized user inputs within the interface routine prior to sending the recognized user inputs to the application program. Preferably, the interface routine is one of several standard types, and may use any recognizer routine of the same type (e.g. text, numeric, etc.). For example, a text recognizer interface routine may work with several brands of text recognizer routines. By using the interface routine, an application does not have to interact with each of the recognizer routines itself, and will automatically work with each recognizer that the interface routine supports.

A method for interfacing between application programs and recognizer routines in a computer system in accordance with the present invention comprises the steps of: 1) initializing a computer implemented recognition user interface process on a computer system to serve as an interface between at least one application program running on the computer system, whereby the application program and the recognition routine communicate with each other through the interface; and 2) activating the computer implemented recognition user interface process such that selected inputs to the computer system by a pointing mechanism of the computer system are intercepted by the recognition user interface process. The first step of initializing the process preferably includes the steps of selecting an interface type and selecting a corresponding type of recognition routine. Often, the interface type is a text type interface, but can also include any other type of interface including numeric, graphical, musical, etc. The recognition user interface process is preferably operative to display at least one recognition field in an interface area of a screen of the computer system, and may also display one or more control fields in the interface area. The selected inputs intercepted by the recognition user interface process are analyzed to determine whether a user is attempting to edit a recognition field, activate a control field, or perform some other function on the interface area. The interface routine is operative to send recognized inputs to the application program, when appropriate, as determined by the analyzing step. Preferably, the editing steps supported by the recognition user interface process includes at least the ability to delete, add, and change entries in the recognition field.

A computer system in accordance with the present invention includes a central processing unit (CPU), a screen assembly coupled at the CPU, a pointer mechanism, an application program running on the CPU, a mechanism for recognizing ink inputs, and an interface mechanism operative to display an interface image on the screen of the CPU, receive ink inputs made on the interface image by the pointer mechanism, send ink inputs to the mechanism for recognizing ink inputs, receive recognized ink from the mechanism for recognizing ink inputs, and send recognized ink to the application program. Preferably, the application is running under an operating system. Also preferably, the mechanism for recognizing ink inputs is a computer implemented process comprising a recognition routine running under the operating system.

In the preferred embodiment, the screen assembly comprises a dual function display including an output screen with an integrated input tablet. A stylus can "engage" the input tablet to serve as the pointer mechanism. The interface mechanism preferably is a computer implemented process comprising an interface routine running under the operating system. Again preferably, the interface routine is further operative to providing editing capabilities on the recognized ink objects prior to sending the recognized objects to the application program.

An advantage of the present invention is that it provides consistent input and editing models for multiple application programs and for multiple recognition routines. This has the added advantage of reducing the amount of code that must be written by application program developers and by recognition routine developers. It also allows new or improved editing models to be added without the need to revise application programs, recognition routines, or operating systems. Most importantly, the recognition editor and interface of the present invention provides an effective, consistent user interface for both editing and input purposes.

These and other advantages of the present invention will become apparent upon reading the following detailed descriptions and studying the various figures of the drawings.

DETAILED DESCRIPTION OF THE PREFERRED EMBODIMENTS

The present invention is well suited for pointer based computer systems such as the pen-based, pen-aware and mouse-based systems that are currently popular. For the purposes of illustration, the invention will be described in connection with a pen-based or pen-aware computer system, hereinafter generically referred to as a "pen computer system", "pen system", or the like.

Figure 1:
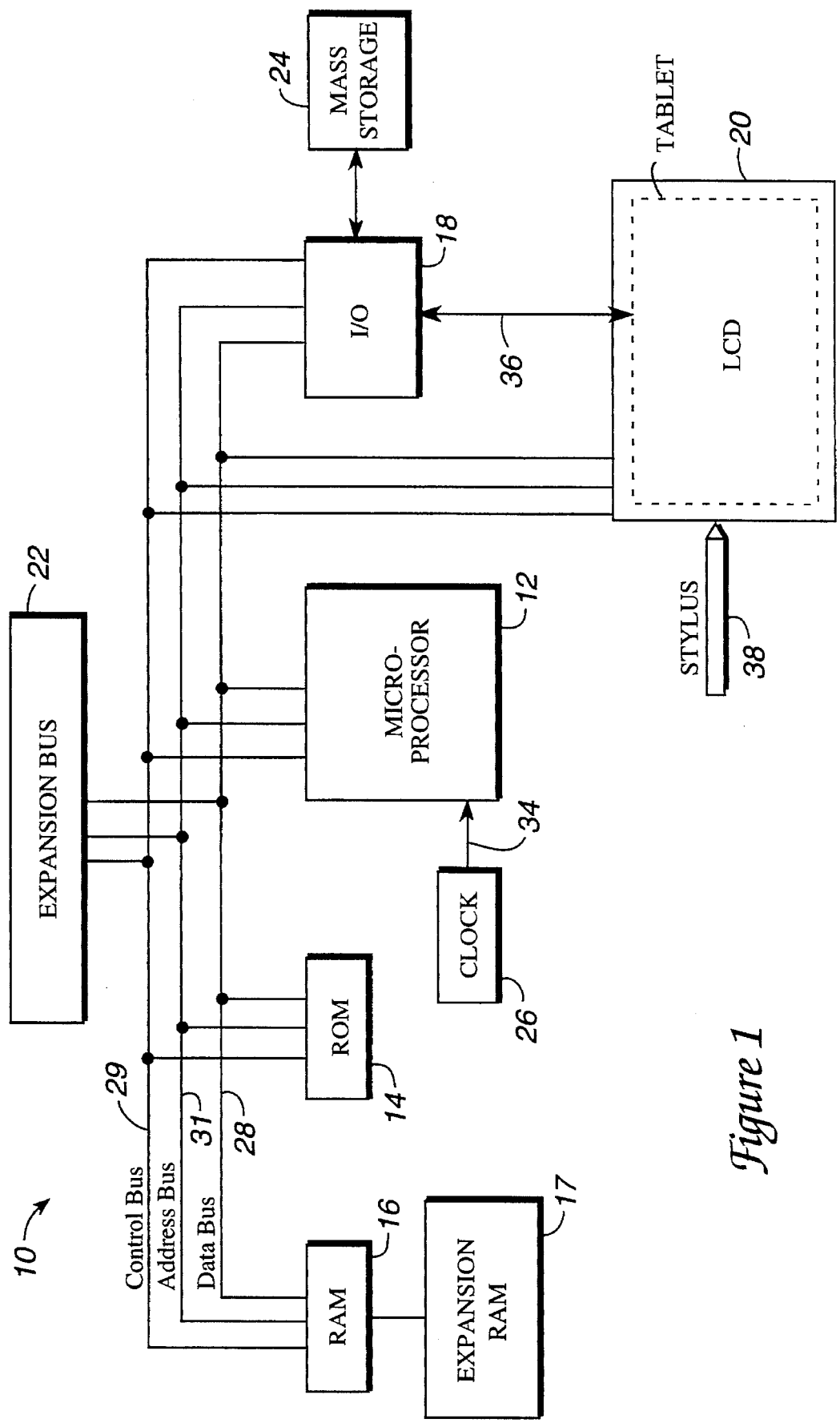
FIG. 1 is a block diagram of a pen computer system in accordance with the present invention.

As shown in FIG. 1, a pen computer system 10 in accordance with the present invention includes a central processing unit (CPU) 12, read only memory (ROM) 14, random access memory (RAM) 16, expansion RAM 17, input/output (I/O) circuitry 18, display assembly 20, and expansion bus 22. The pen computer system 10 may also optionally include a mass storage unit 24 such as a disk drive unit or nonvolatile memory such as flash memory and a real-time clock 26.

The CPU 12 is preferably a commercially available, single chip microprocessor, and is preferably a complex instruction set computer (CISC) chip such as the 68030 microprocessor available from Motorola, Inc. CPU 12 is coupled to ROM 14 by a data bus 28, control bus 29, and address bus 31. ROM 14 contains the basic operating system for the pen computer system 10. CPU 12 is also connected to RAM 16 by busses 28, 29, and 31 to permit the use of RAM 16 as scratch pad memory. Expansion RAM 17 is optionally coupled to RAM 16 for use by CPU 12. CPU 12 is also coupled to the I/O circuitry 18 by data bus 28, control bus 29, and address bus 31 to permit data transfers with peripheral devices.

I/O circuitry 18 typically includes a number of latches, registers and direct memory access (DMA) controllers. The purpose of I/O circuitry 18 is to provide an interface between CPU 12 and such peripheral devices as display assembly 20 and mass storage 24.

Display assembly 20 of pen-based computer system 10 is both an input and an output device. Accordingly, it is coupled to I/O circuitry 18 by a bi-directional data bus 36. When operating as an output device, the display assembly 20 receives data from I/O circuitry 18 via bus 36 and displays that data on a suitable screen. The screen for display assembly 20 can be a liquid crystal display (LCD) of the type commercially available from a variety of manufacturers. The input device ("tablet") of display assembly 20 can be a thin, clear membrane which covers the LCD display and which is sensitive to the position of a stylus 38 on its surface. Alternatively, the tablet can be an embedded RF digitizer activated by an "active" RF stylus. Combination display assemblies are available from a variety of vendors.

Other types of user inputs can also be used in conjunction with the present invention. While the method of the present invention is described in the context of a pen system, other pointing devices such as a computer mouse, a track ball, or a tablet can be used to manipulate a pointer on a screen of a general purpose computer. Therefore, as used herein, the terms "pointer", "pointing device", "pointer inputs" and the like will refer to any mechanism or device for pointing to a particular location on a screen of a computer display.

Some type of mass storage 24 is generally considered desirable. However, the mass storage 24 can be eliminated by providing a sufficient amount of RAM 16 and expansion RAM 17 to store user application programs and data. In that case, RAMs 16 and 17 can be provided with a backup battery to prevent the loss of data even when the pen computer system 10 is turned off. However, it is generally desirable to have some type of long term storage 24 such as a commercially available miniature hard disk drive, non-volatile memory such as flash memory, battery backed RAM, PC-data cards, or the like.

In operation, information is input into the pen computer system 10 by "writing" on the screen of display assembly 20 with the stylus 38. Information concerning the location of the stylus 38 on the screen of the display assembly 20 is input into the CPU 12 via I/O circuitry 18. Typically, this information comprises the Cartesian (i.e. x & y) coordinates of a pixel of the screen of display assembly 20 over which the tip of the stylus is positioned. Commercially available combination display assemblies include appropriate circuitry to provide the stylus location information as digitally encoded data to the I/O circuitry of the present invention. The CPU 12 then processes the data under control of an operating system and possibly an application program stored in ROM 14 and/or RAM 16. The CPU 12 then produces data which is output to the display assembly 20 to produce appropriate images on its screen.

Expansion bus 22 is coupled to the data bus 28, the control bus 29, and the address bus 31, similar to the other components in system 10. Expansion bus 22 provides extra ports to couple devices such as modems, display switches, microphone, speaker, etc. to the CPU 12.

Figure 2:
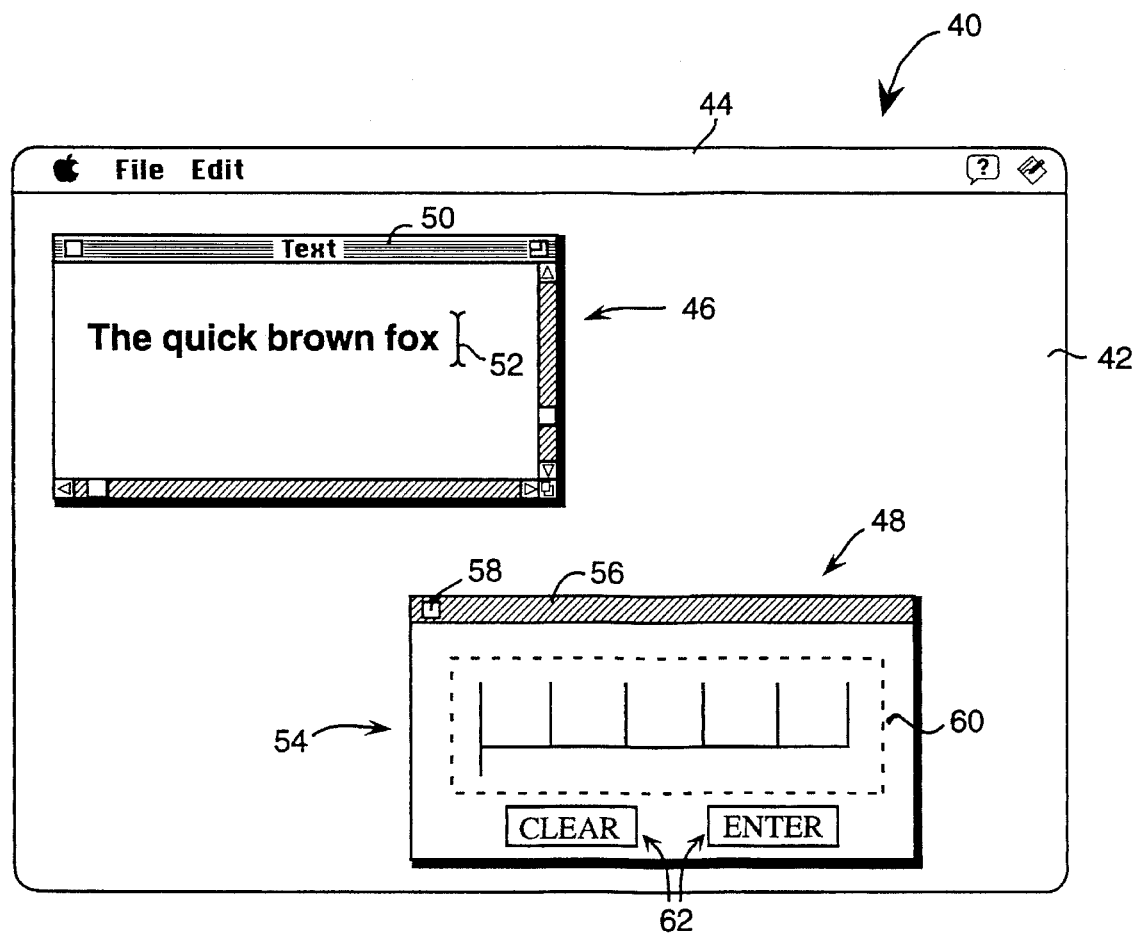
FIG. 2 is a view of a screen of a Macintosh computer system made by Apple Computer, Inc. of Cupertino, Calif. having both an open text window and an open interface window in accordance with the present invention.

In FIG. 2, a screen 40 of a Macintosh computer system made by Apple Computer, Inc. of Cupertino, Calif., includes a desktop area 42, a menu bar 44, an application window 46, and a recognition editor and interface window 48 in accordance with the present invention. The desktop area 42 and menu bar 44 are well known to those who use Macintosh computer systems. Briefly, the desktop 42 is an image created by a "Finder" portion of the Macintosh operating system which serves as a back drop for icons and windows associated with the computer system. The menu bar 44 includes a number of menu labels which can be selected by a pointer mechanism (such as a mouse or stylus) to display a "pull-down" menu of user functions or applications.

Likewise, an application window such as the application window 46 is also very familiar to users of Macintosh computer systems. The illustrated application window is developed by an application program known as "TeachText", which is a basic word processing system often supplied with Macintosh computer systems. The window 46 is currently active (i.e., available for user input), as indicated by the horizontal lines on the title bar 50. Thus far, the phrase "the quick brown" has been entered into the window 46 of the TeachText application. An "I-beam" 52 is provided within the window 46 to indicate the location of the next letter to be entered within the application window. Again, the use of the Macintosh computer system, application windows 46, and the TeachText program is well known to Macintosh computer users.

The recognition window 48 is produced by a computer implemented process of the present invention which will henceforth be referred to as the recognition editor and interface (REI) routine. The REI routine is implemented as a utility component under the Macintosh computer operating system. Macintosh utility components are functionally equivalent to dynamically linked libraries of other operating systems. The REI routine is operative to create the contents 54 of the window 48. The window 48, itself, is preferably "owned" by the application program with which it is linked, namely with the "TeachText" application in this example.

Window 48 is preferably the type known as a "palette", and is identifiable by the unique pattern on the top bar 56 of the window 48. Provided on the top bar 56 is a "close box" 58 which, when engaged by a pointer, causes the window 48 to "close", i.e., be removed from the desktop 42. Palettes are distinguishable from application windows, such as application window 46, in that they are always "active", i.e., they are always ready to receive user input. Again, the implementation and use of palettes, such as the palette of recognition window 48, is well known to those skilled in the art.

The content area 54 includes a recognition area 60, and a control area 62. As will be discussed in greater detail subsequently, a user can "write" into the recognition area 60, such as with stylus 38, and the resultant "ink" will be "recognized" by a recognition routine and returned as a recognized object. The control area 62 provides control commands either for the recognition area 60 or for a part of the computer system which is external to content area 54.

The functioning of the REI routine will be discussed in terms of several examples. In a first example, the REI routine is of a "text" type which is operative to process the characters of the alphabet. This type of REI routine interface is illustrated with reference to FIGS. 3A–3F.

Figure 3A:
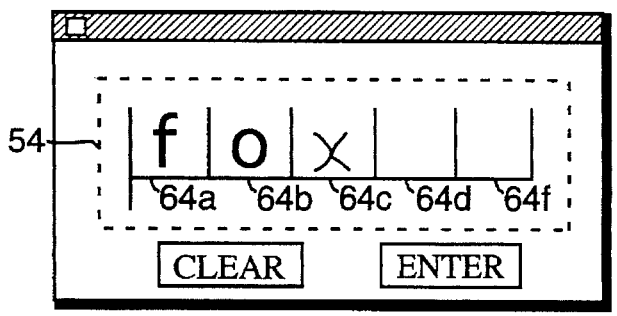
FIGS. 3A–3F illustrate the input, recognition, and editing of characters in the interface window of the present invention.

In FIG. 3A, the recognition area 54 is comprised of five recognition fields 64A, 64B, 64C, 64D, and 64F. A user has already entered the letter "f" into the recognition field 64A, and the letter "o" into the recognition field 64B, and these fields 64A and 64B have been "recognized" by a recognizer routine such that the recognized objects "f" and "o" have been placed in recognition fields 64A and 64B, respectively. In recognition field 64C, the user is attempting to write a "x" with the stylus 38.

Figure 3B:
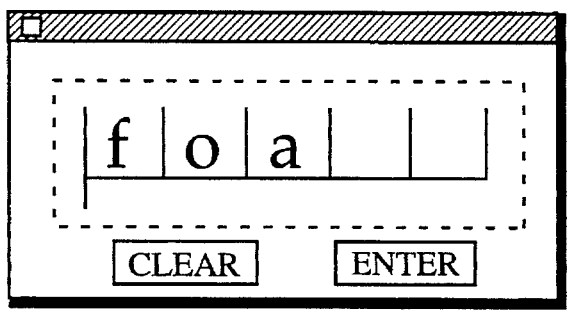
Figure 3C:
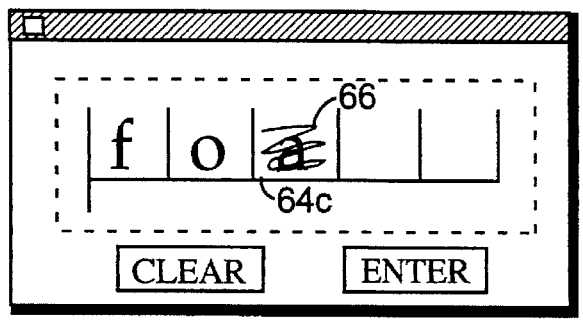
Figure 3D:
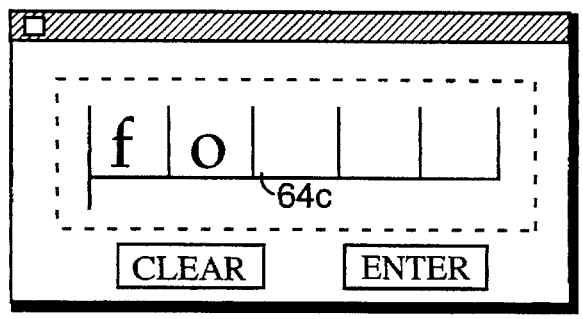
Figure 3E:
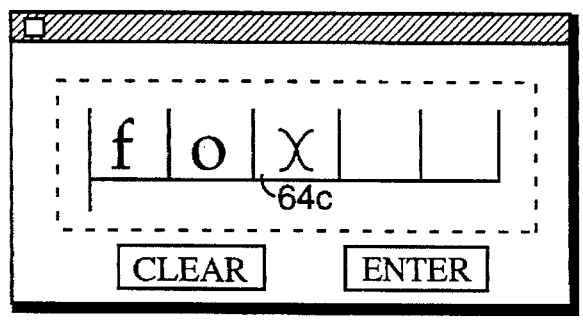
Figure 3F:
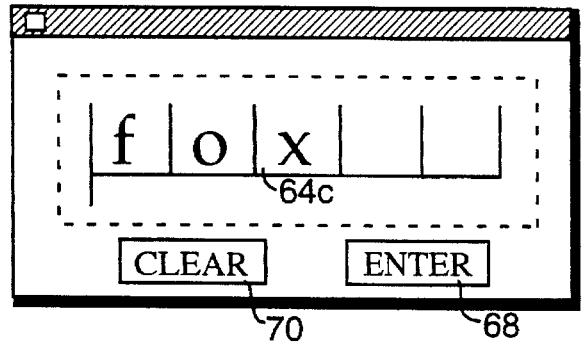

In FIG. 3B, the recognizer routine has returned the letter "a" rather than the "x" that the user had desired. Therefore, the user produces a scrub gesture 66 over the recognized letter "a" in recognition field 64C, and the system removes the letter "a" from the field 64C as seen in FIG. 3D. This "scrub" gesture is one of several editing gestures of which the REI routine is capable of understanding. Next, as shown in FIG. 3E, a new letter "x" is entered into the recognition field 64C by means of this stylus 38 and, in FIG. 3F an "x" has been recognized by the recognizer routine and entered into the recognition field 64 by the REI routine. The user can then engage the Enter button 68 with a "tap" of the stylus 38 (i.e. pressing the tip of the stylus to the screen and then rapidly removing it from the screen) to send the letters "f", "o", and "x" to the open application window 46 at the location of the I-beam 52 to lengthen the phrase to read "the quick brown fox". If the user decides not to send the letters "fox" to open application window 46, the Clear button 70 can be tapped to clear the fields 64A–64E of the recognition area 60.

The interface of the present invention, unlike most interfaces of the prior art, is not limited to use with only text-type inputs. An example of a non-text-type REI routine will be explained with reference to FIGS. 4A–4E and 5A–5D.

Figure 4A:
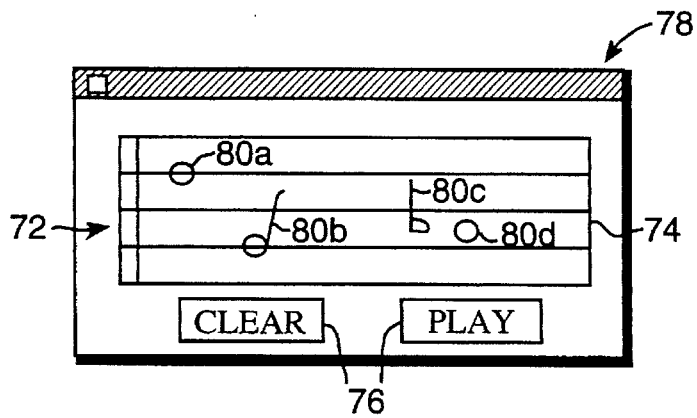
FIGS. 4A–4E illustrate the input, recognition, and editing of notes in an alternative form of interface window of the present invention.
Figure 4B:
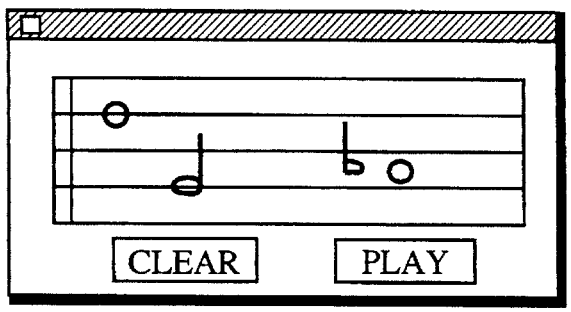
Figure 4C:
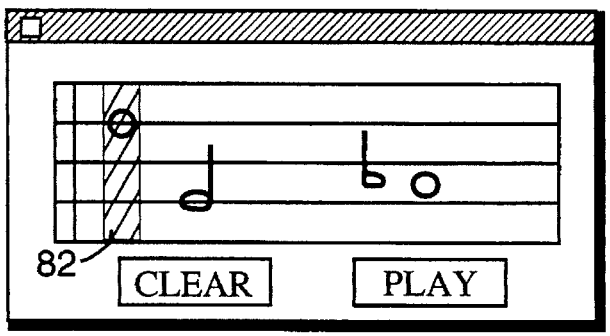
Figure 4D:
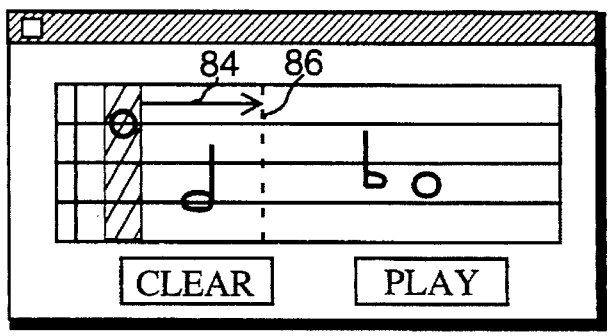
Figure 4E:
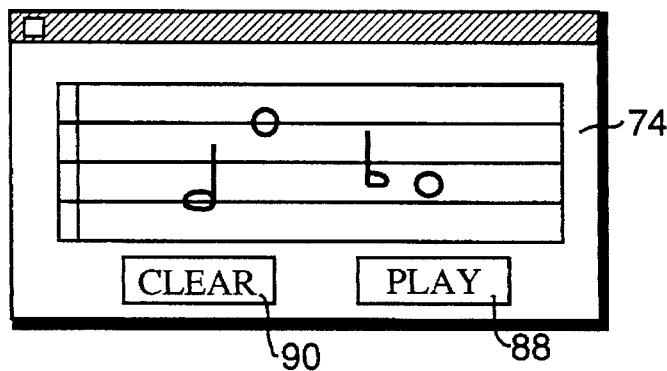

In FIG. 4A, the REI routine displays a content area 72 including a recognition field 74 and a control area 76. Again, the window 78 is preferably controlled by an application program which is linked to the REI routine. In this instance, the recognition field is a musical staff upon which a user has "inked" musical notations 80A, 80B, 80C, and 80D. The notation 80A corresponds to a whole D note, the notation 80B corresponds to a half G note, notation 80C corresponds to a "flat", and notation 80D corresponds to a whole A note. The ink 80A–80D is sent to an appropriate recognition routine to return the recognized notation shown in FIG. 4B. In FIG. 4C, the whole D note has been selected by stylus 38 as indicated by the shading 82. The note can be selected, for example, by placing the stylus over the note for a predetermined period of time until the shading 82 appears. The whole D note can then be "dragged" as indicated by arrow 84 to a new position indicated by the broken line 86. This dragging operation, as will be appreciated to those skilled in the art, involves moving the stylus 38 across the screen 40 until it reaches the position on the screen indicated by the broken line 86, at which time the stylus is removed from the screen. This step of removing the stylus from the screen will release the whole D note at the position indicated by the broken line 86, and will remove the shading 82 from the screen. This "dragging" process is another example of the specialized editing made possible by the REI routine of the present invention. After the recognized have been placed as desired, a "Play Button" 88 can be selected by the stylus 38 to cause the application program to play the notes indicated in the recognition field 74. Alternatively, the stylus can engage the "Clear Button" 90 to clear the recognized notes from the recognition area 74.

Figure 5A:
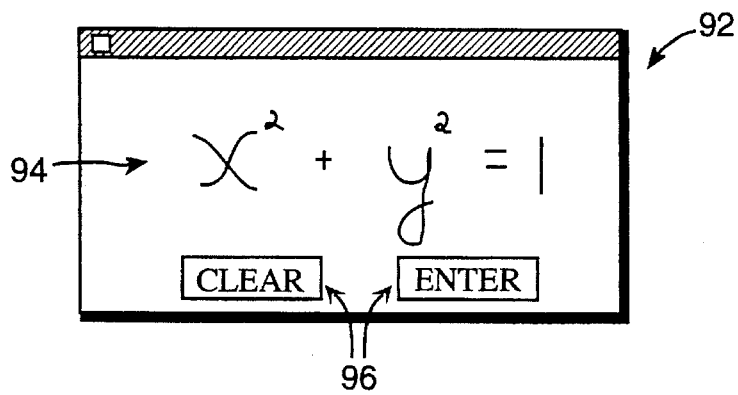
FIGS. 5A–5D illustrate the input, recognition, and editing of inputs to another type of interface window of the present invention.
Figure 5B:
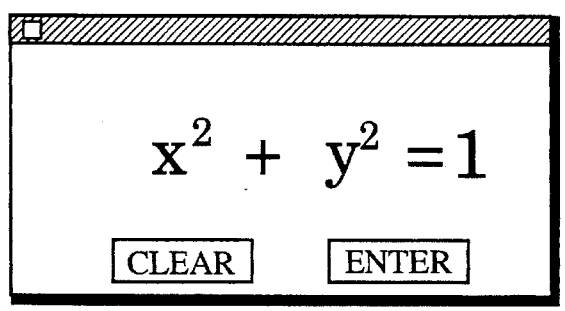
Figure 5C:
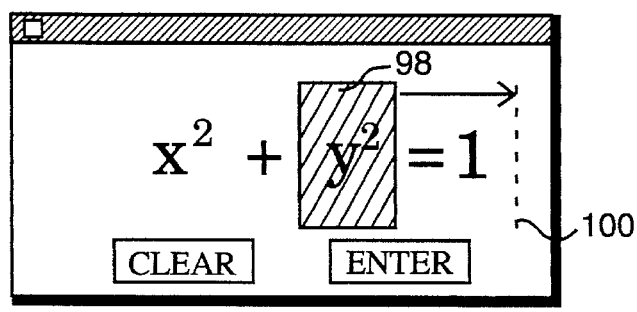
Figure 5D:
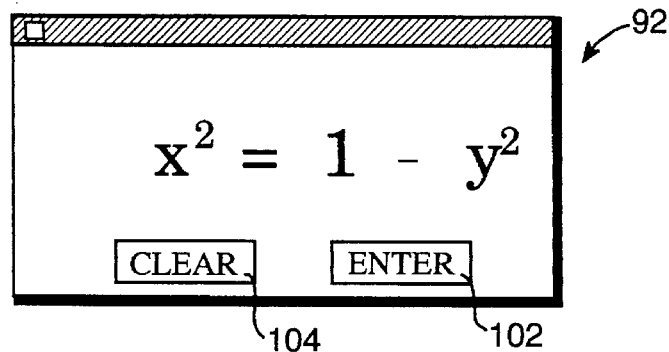

FIGS. 5A–5D illustrate yet another type of REI routine interface. In FIG. 5A, a window 92 is shown including a recognition area 94 and a control area 96. A user has entered a mathematical formula with a stylus 38 into the recognition area. In this instance, the inked input is the mathematical formula "$x^2+y^2=1$". In FIG. 5B, a recognition routine has recognized this formula and has returned it as a recognized formula object. In FIG. 5C, the "$y^2$" portion of the formula has been selected as indicated by shading 98 and is dragged with the stylus 38 to a new position indicated by the broken line 100. The REI interface not only recognizes that the $y^2$ is to be moved adjacent to the number "1", but it also recognizes that the formula needs to be rewritten as "$x^2=1-y^2$". This is yet another example of a type of editing that can be performed by the REI routine of the present invention. As before, an Enter Button 102 can be activated by stylus 38 to send the formula to an open window of an application program or the Clear Button 104 can be activated stylus 38 to clear the formula from window 92.

Figure 6:
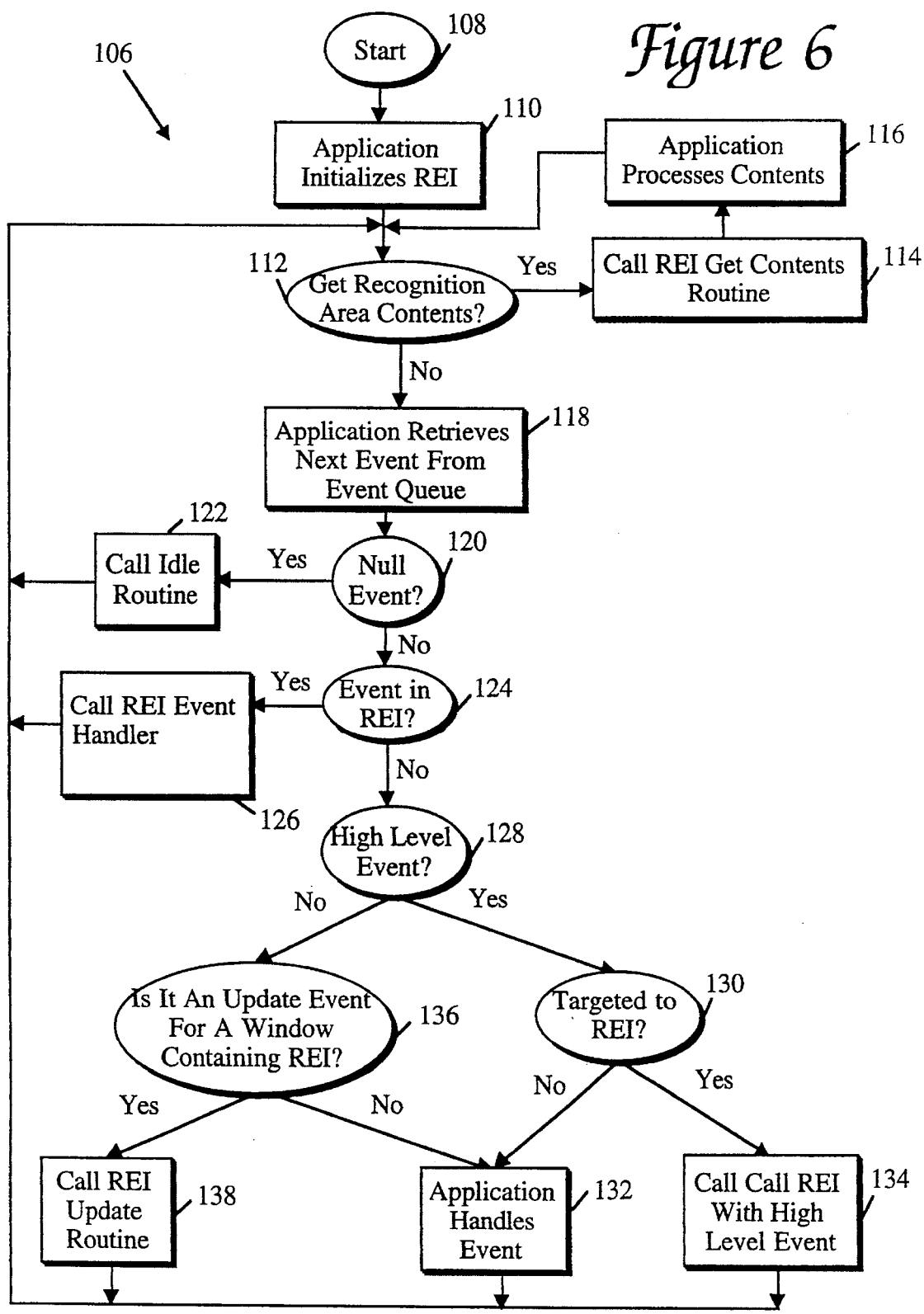
FIG. 6 is a flow diagram of a process in accordance with the present invention for providing a recognition editor and interface (REI) routine.

FIG. 6 illustrates a computer implemented process 106 in accordance with the present invention. The process begins at 108, and, in a step 110, the application program initializes the REI. This initialization can include such factors as specifying the type of interface desired, and specifying one or more recognizer routines to be used. Next, in a decision step 112, it is determined whether the application program is ready to receive the contents of the recognition area. This can be accomplished in several ways, as determined by the application. For one, the user can explicitly ask the REI routine to send the recognition area contents to the application program by hitting a key such as "Enter" or "Play". Alternatively, the contents of the recognition area could automatically be sent to the application program after a predetermined period of time known as a "timeout". If the application is to get the contents of the recognition area, a step 114 makes a call to the REI "get contents" routine and the application program processes the contents of the recognition area in step 116. Process control then returns to step 112.

If the contents of the recognition area are not to be sent to the application program at this time, the application requests the next event from the event queue in a step 118. As is well known to those skilled in the art of programming Macintosh computer systems, application programs will periodically send inquiries to the "event queue" of the operating system to see if there is any user input for the application program. The event queue is simply a time-ordered stack of system events have occurred and which may or may not be of interest to a particular application program. Null events will be sent by the system if no user action takes place within a specified period of time, to allow periodic tasks to be processed. If it is determined in a step 120 that there is a null event in the event queue, an idle routine will be called in step 122 and process control will return to step 112. If the event in the event queue is not a null event, a step 124 determines whether the event is in the window for which the REI routine provides the contents. If it is in the window containing the REI content editing and display area, then a step 126 calls the REI event handler, after which process control returns to step 112. If the event in the event queue is not an REI event, a step 128 determines whether it is a high level event. An example of a high level event is the command "bold" which will turn selected objects from their normal view to a bold view. Next, in a step 130, it is determined whether this high level event is targeted to the REI routine. If it is not, the application program handles the event in step 132. If the high level event is targeted to the REI routine, the REI routine is called with the high level event in a step 134.

If step 128 determines that the event in the event queue is not a high level event, a step 136 determines whether it is a update event for the window containing the REI content editing and display area. If it is not, the application again handles the event in a step 132. If it is, an REI update routine is called in a step 138. Process control is returned to step 112 after the completion of steps 132, 134, or 138.

Figure 7:
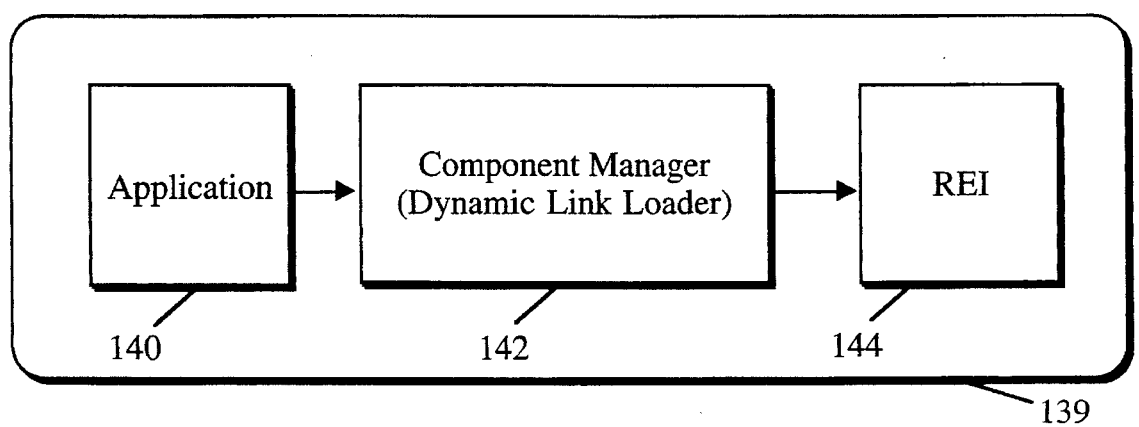
FIG. 7 illustrates the "Application Initializes REI" step 110 of FIG. 6.
Figure 8:
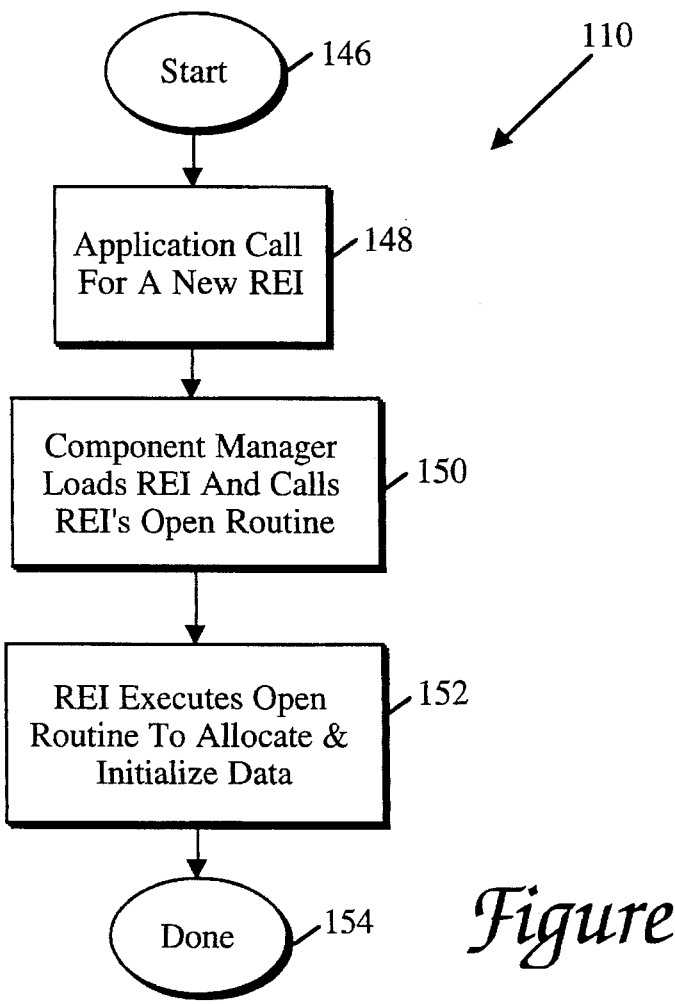
FIG. 8 is a flow diagram further illustrating step 110 of FIG. 6.

FIGS. 7 and 8 are used to illustrate the step 110 "application initializes REI" of FIG. 6 in greater detail. It should be appreciated that the processes in FIGS. 7 and 8 are somewhat specific to the Macintosh computer system. However, as will be appreciated by those skilled in the art, analogous processes can be implemented on other computer systems and under other operating systems, such as the MS-DOS operating system, the Microsoft Windows operating system, or the UNIX operating system.

In FIG. 7, the Macintosh operating system 139 supports an application program 140, a component manager, 142, and the REI routine 144 of the present invention. The application program 140 conveniently communicates with the REI routine 144 by means of the component manager 142. Alternatively, and with more work, an application could communicate directly with an REI routine 144.

The component manager 142 is a dynamic link loader for loading dynamically linked libraries (DLL), and forms a part of the Macintosh 7.0 operating system produced by Apple Computer, Inc. The purpose of the component manager is to dynamically locate and load independent segments of code (known as "components") and then link them together so that they can interact as a unified whole. Components are a form of DLL. In this instance, the component manager links the REI routine 144 (which is implemented as a component) dynamically with the application program 140. An example of a DLL in the Microsoft Windows operating system is PENWIN.DLL, which adds pen extensions to Microsoft Windows.

In FIG. 8, the process 110 of FIG. 6 begins at 146, and, in a step 148, the application program makes a call to load a new REI routine. Next, in a step 150, the component manager loads the REI into RAM memory, and calls the REI's "open routine". As is well known to those skilled in the art, all components which can be loaded by a component manager have a built-in routine which allows them to open and initialize themselves. Next, in a step 152, the REI routine executes the open routine to allocate and initialize data that it will use to perform its functions. The process 110 is then completed as indicated at 154.

Figure 9:
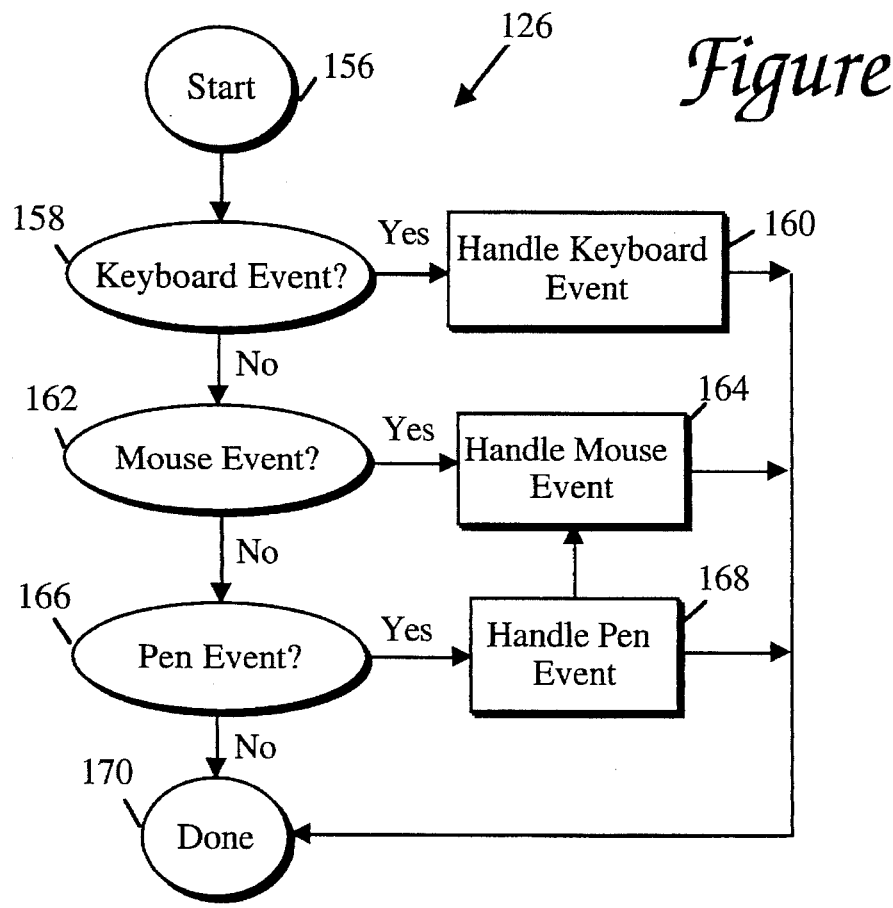
FIG. 9 is a flow diagram that illustrates the "Call REI Event Handler" step 126 of FIG. 6.

In FIG. 9, the "call REI event handler" step 126 is illustrated in greater detail. The process 126 begins at 156, and, in a decision step 158 it is determined whether the REI event is a keyboard event. If it is, a step 160 handles the keyboard event. If the event is not a keyboard event, a step 162 determines whether it is a mouse event. If it is, step 164 handles the mouse event. If the event is neither a keyboard event nor a mouse event, the process 126 then determines whether it is a pen event in a step 166. If it is a pen event, the pen event is handled in a step 168. If the event is not a keyboard event, a mouse event, or a pen event, the process is done as indicated at 170. The process is also completed at 170 after the completion of steps 160, 164, or 168. Preferably, the steps 158, 162, and 166 are handled as a large "case" statement, the implementation of which is well known to those skilled in the art of programming, and particularly skilled in the art of programming in the C programming language.

Figure 10:
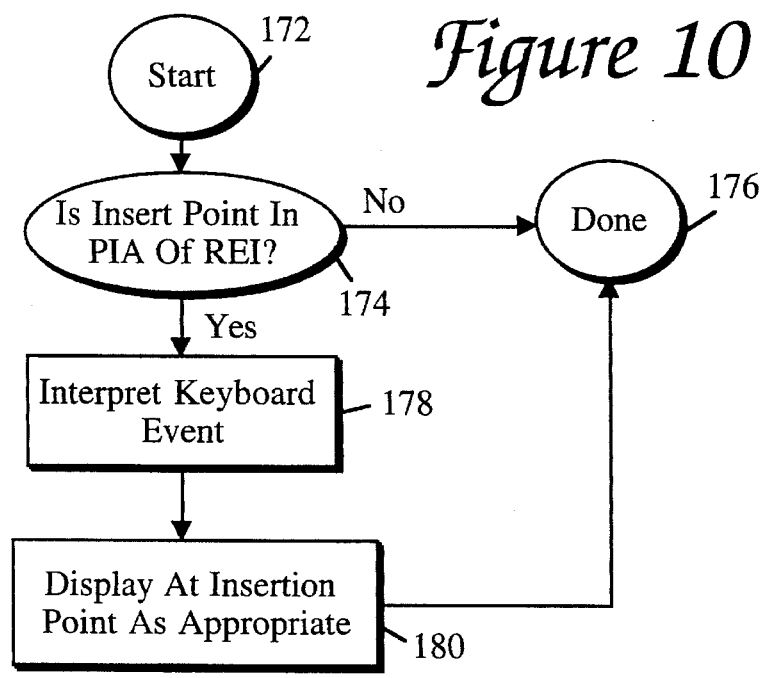
FIG. 10 is a flow diagram illustrating the "Handle Keyboard Event" step 160 of FIG. 9.

FIG. 10 illustrates the "handle keyboard event" in step 160 of FIG. 9 in greater detail. The process 160 begins at 172, and, in a decision step 174, it is determined whether the insertion point is in the pad insertion area (PIA) of the REI routine. If it is not, the pad insertion area (the recognition area) is not ready to accept keyboard inputs and the process is done at 176. If the insert point is in the PIA of the REI routine, the keyboard event is interpreted in a step 178. Next, the letter, number, etc., is displayed at the insertion point of the PIA in the REI routine as appropriate. The process is then completed again at step 176.

Figure 11:
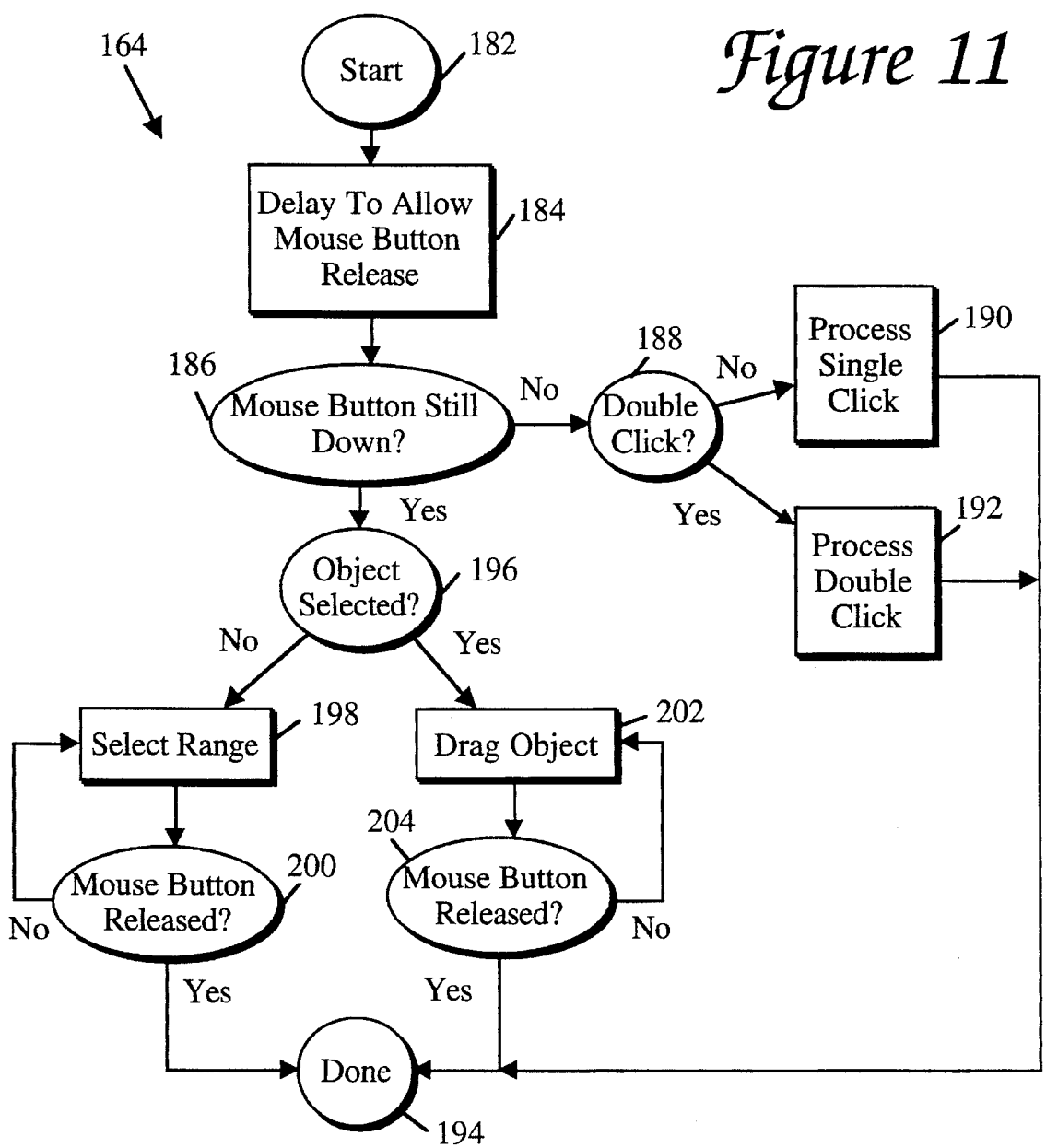
FIG. 11 is a flow diagram illustrating the "Handle Mouse Event" step 164 of FIG. 9.

In FIG. 11, the step 164 "handle mouse event" of FIG. 9 is illustrated in greater detail. Process 164 begins at 182, and, in a step 184, a delay is provided to allow the mouse button to release. This is because if the mouse button remains down, a user is intending to either drag an object or select a range with the mouse. If the mouse button is released within the period of time, the user is intending to either do a single click or a double click of the mouse to perform various functions. Therefore, after the delay time of step 184, a decision step 186 determines whether the mouse button is still down. If it is not, a step 188 determines whether the user has made a single click or a double click of the mouse button. If a single click has been made, a step 190 processes the single click, and if a double click has been made, a step 182 processes the double click.

If step 186 determines that the mouse button is still down after the delay of step 184, a step 196 determines whether the mouse pointer is on a selected object. If it is not on a selected object, the user is intending to select an object as indicated by the "select range" step 198. A step 200 determines if the mouse button has been released. If not, it continues to loop between steps 198 and 200 until the mouse button has been released. When step 200 determines that the mouse button has been released, the process 164 is completed as indicated at 194.

If the mouse button was still down as determined by step 186 and the object was selected as determined by 196, the user is intending to drag the selected object as indicated by step 202. A step 204 determines whether the mouse button has been released. If not, the process continues to loop between steps 202 and 204 until the mouse button is released at which time the process is completed as indicated at 194.

It should be noted that while the process 164 of FIG. 11 has been described in terms of a conventional, one button mouse, that a number of pointing devices can be used to emulate a one button mouse. For example, a track ball can be used to emulate the mouse, as is well known to those skilled in the art. Also, the stylus 38 can be used to emulate a mouse in the following fashion. If a single tap is made on the screen 40 with the stylus 38, the pen computer system can process this tap as a single click in step 190 of FIG. 11. If a user taps twice with the stylus 38 on the screen 40, this can be processed as a double click in step 192. A user can emulate a mouse with its button down by engaging the stylus with the screen 40, not moving the stylus for a predetermined (e.g., ¼ second) period of time, and then dragging the stylus across the screen. Lifting the stylus from the screen would be the equivalent of releasing the mouse button.

Figure 12:
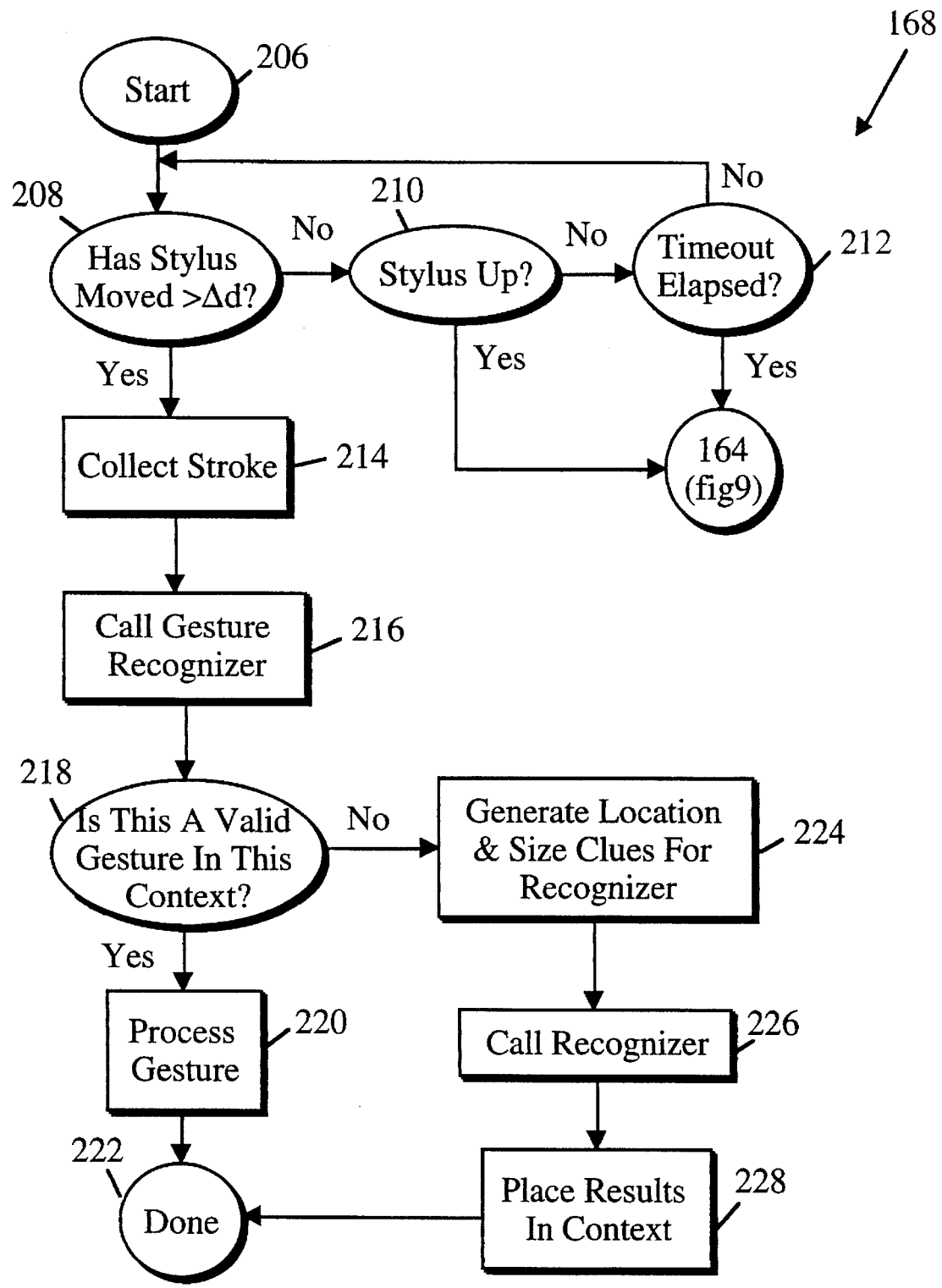
FIG. 12 is a flow diagram illustrating the "Handle Pen Event" step 168 of FIG. 9.

FIG. 12 illustrates the step 168 "handle pen event" of FIG. 9 in greater detail. The process 168 begins at 206, and it is determined in a step 208 whether the stylus 38 has moved a distance greater than Δd on the screen 40. This distance Δd is usually measured in pixels, and may be, for example, 3–5 pixels in length. If the pen or stylus has moved to greater than Δd, a step 210 determines whether the stylus is up. If the stylus is up, then the stylus will act as a mouse, and step 164 of FIG. 9 is executed. If not, a step 212 determines whether a timeout has elapsed. This timeout, which is a short period of time such as ¼ of a second, is used to distinguish between the stylus acting in a "pen" mode or acting as a mouse. If the time out has elapsed then, again, the stylus is being used in a "mouse" like fashion, and step 164 of FIG. 9 is executed. If a timeout has not elapsed, process control is returned to step 208.

If the stylus has moved greater than Δd without being lifted from the screen 40 and before the time out has elapsed, step 208 causes step 214 to collect the stroke made by the stylus. As described previously, a stroke is a collection of data points representing the path of the stylus across the screen 40. Next, in a step 216, a gesture recognizer routine is called to determine whether the stroke collected in step 214 is a gesture. Examples of gestures include the aforementioned "scrub" gesture. There are other gestures that are also known to those skilled in the art. Next, in a step 218, it is determined whether this is a valid gesture in the current context. For example, the scrub gesture may not have any meaning when made over a control key in the control area of the REI routine. If it is a valid gesture in this context as determined by step 218, the gesture is processed in a step 220 and the process 168 is completed as indicated at 222. If step 218 determines it is not a valid gesture in this context, location and size clues are generated by the REI routine for the recognizer routine in a step 224. The recognizer is then called in a step 226 and passed the collected stroke and the location and size clues, and, in a step 228, the REI routine places the results back into the recognition fields. The process is then completed at 222.

Figure 13:
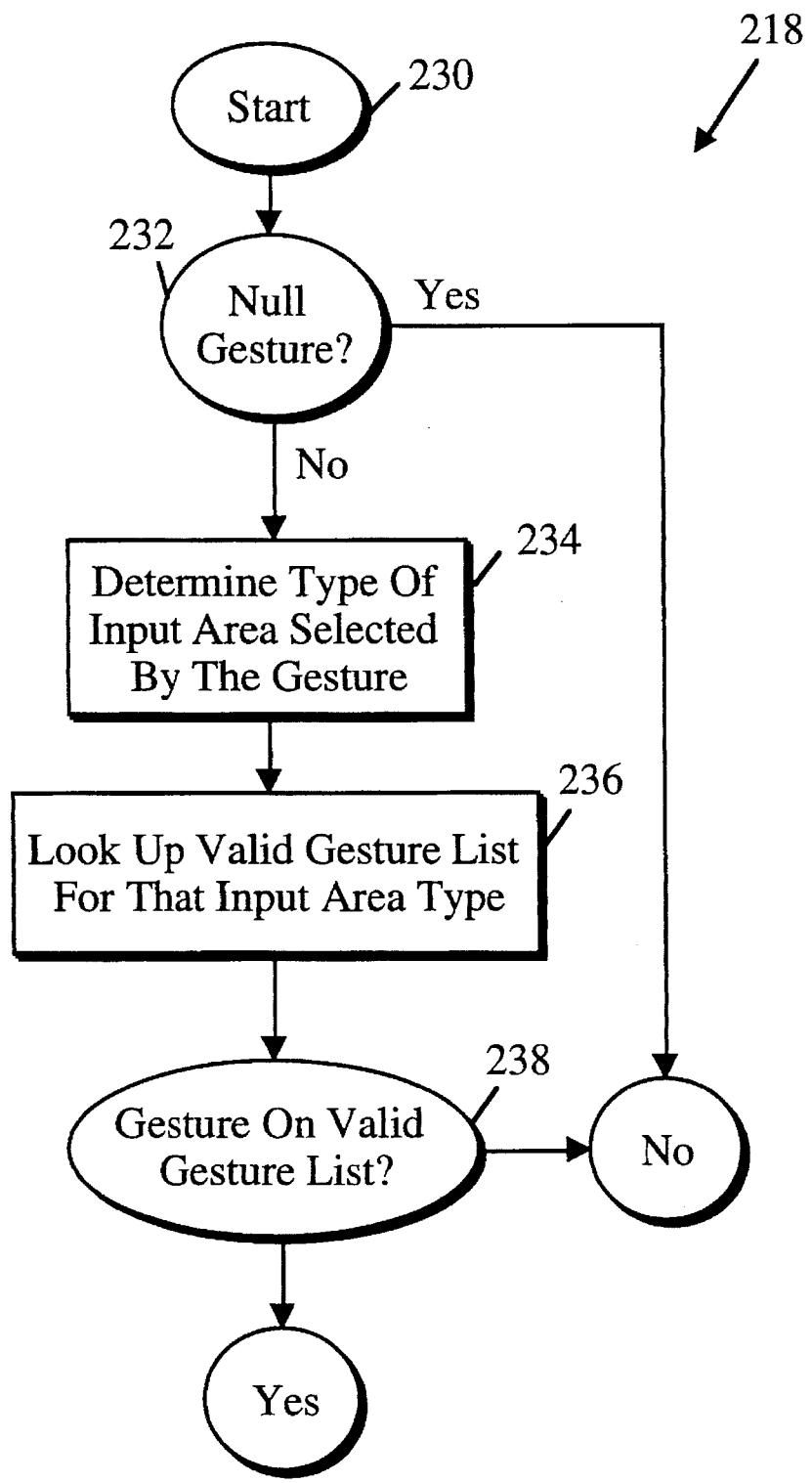
FIG. 13 is a flow diagram illustrating the "Is This a Valid Gesture?" step 218 of FIG. 12.

FIG. 13 illustrates the "is this a valid gesture in this context" step 218 of FIG. 12 in greater detail. Process 218 begins at 230 and, in a step 232, it is determined whether this is a null gesture. A null gesture will be returned by the gesture recognizer if it is unable to recognize the stroke(s). If it is a null gesture, step 218 returns a "no" and the step 224 of FIG. 12 is executed. If step 232 determines it is not null gesture, it is determined in a step 234 what type of input area is selected by the gesture. Next, in a step 236, the process 218 looks up the valid gesture list for the type of input area in which the stroke was made. Finally, in a step 238 it is determined whether the gesture is on the valid gesture list for that input area type. If it is not, a no is returned by the process 218 and the step 224 of FIG. 12 is executed. If the gesture is on the valid gesture list for that input area type as determined by step 238, a "yes" is returned by the process 218 and the step 220 of FIG. 12 is executed.

Figure 14:
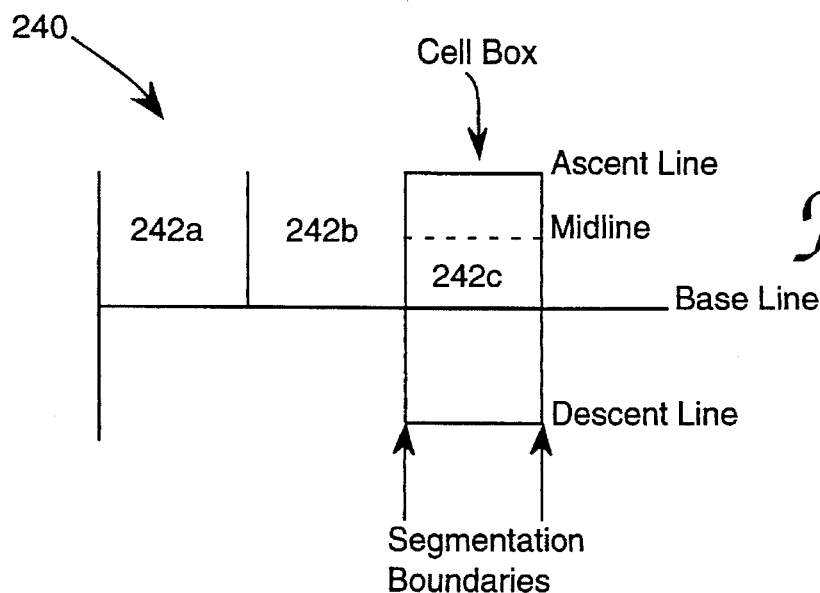
FIG. 14 is an illustration to aid in the description in the "Generate Location and Size Clues" step 224 of FIG. 12.

FIG. 14 illustrates a recognition area 240 for a character-based REI routine. This recognition area 240 is divided into a number of recognition fields 242A, 242B, 242C, etc. Each recognition area includes a cell box into which a set of strokes can be written and recognized to determine a character. A cell box has been shown for the recognition field 242C. Associated with each cell box are a number of boundary lines including an ascent line at the top of the cell box, a descent line at the bottom of the cell box, and a midline approximately half way between a baseline of the recognition area 240 and the ascent line of the cell box. The left and right sides of the cell box are known as "segmentation" boundaries. By utilizing recognition fields 242 and the cell box structure, a number of location and size clues can be generated by the REI routine for the recognizer in step 224 of FIG. 12. For example, since the segmentation boundaries are known, if a stroke is 75% within a particular cell box, the recognizer can be sent the clue that the remaining 25% of the stroke which is not in the cell box is probably a portion of the character that a user meant to write entirely within the cell box. Also, characters which have descenders, i.e., which have a portion of the stroke below the base line, can be more easily distinguished by providing the recognizer with descender information. Also, the size of the character within the cell box, and the midline location, can be sent to the recognizer to help it distinguish between upper case and lower case letters.

Figure 15:
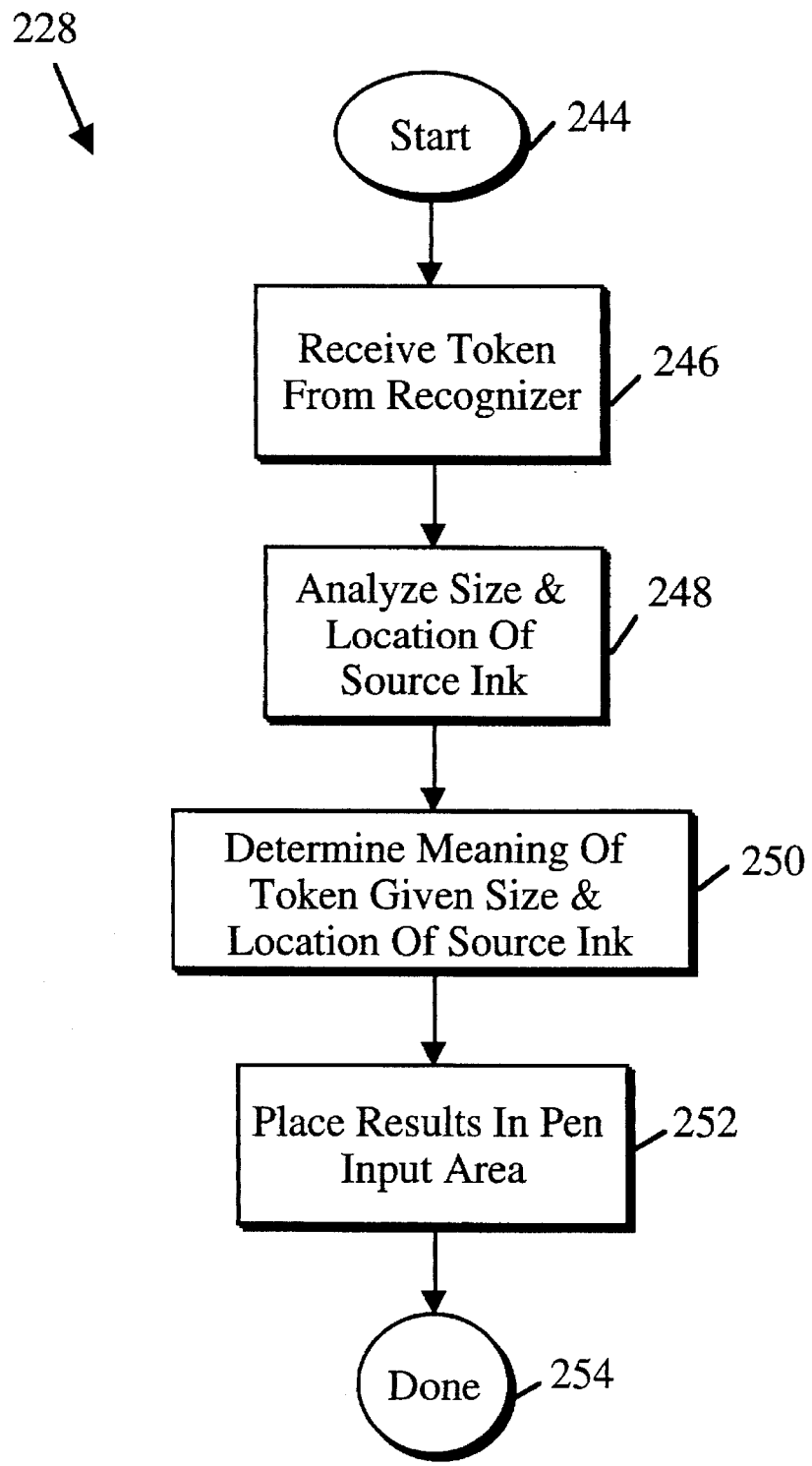
FIG. 15 is a flow diagram of the "Place Results in Context" step 228 of FIG. 12.

FIG. 15 is a flow diagram illustrating step 228 of FIG. 12 in greater detail. Process 228 begins at 244, and, in a step 246, a "token" is received from the recognizer. The term "token" is well known by those skilled in the art to mean an encoded result. The token's type is determined by the recognizer which provides it; it may be a character for text recognizers, a number for numeric recognizers, etc. Next, in a step 248, the size and location of the source ink is analyzed. In a step 250, the meaning of the token given the size and location of the source ink is determined. Finally, in a step 252, the results are placed in the pen input or recognition area generated by the REI routine in step 252, and the process 228 is finished as indicated at 254.

Figure 16:
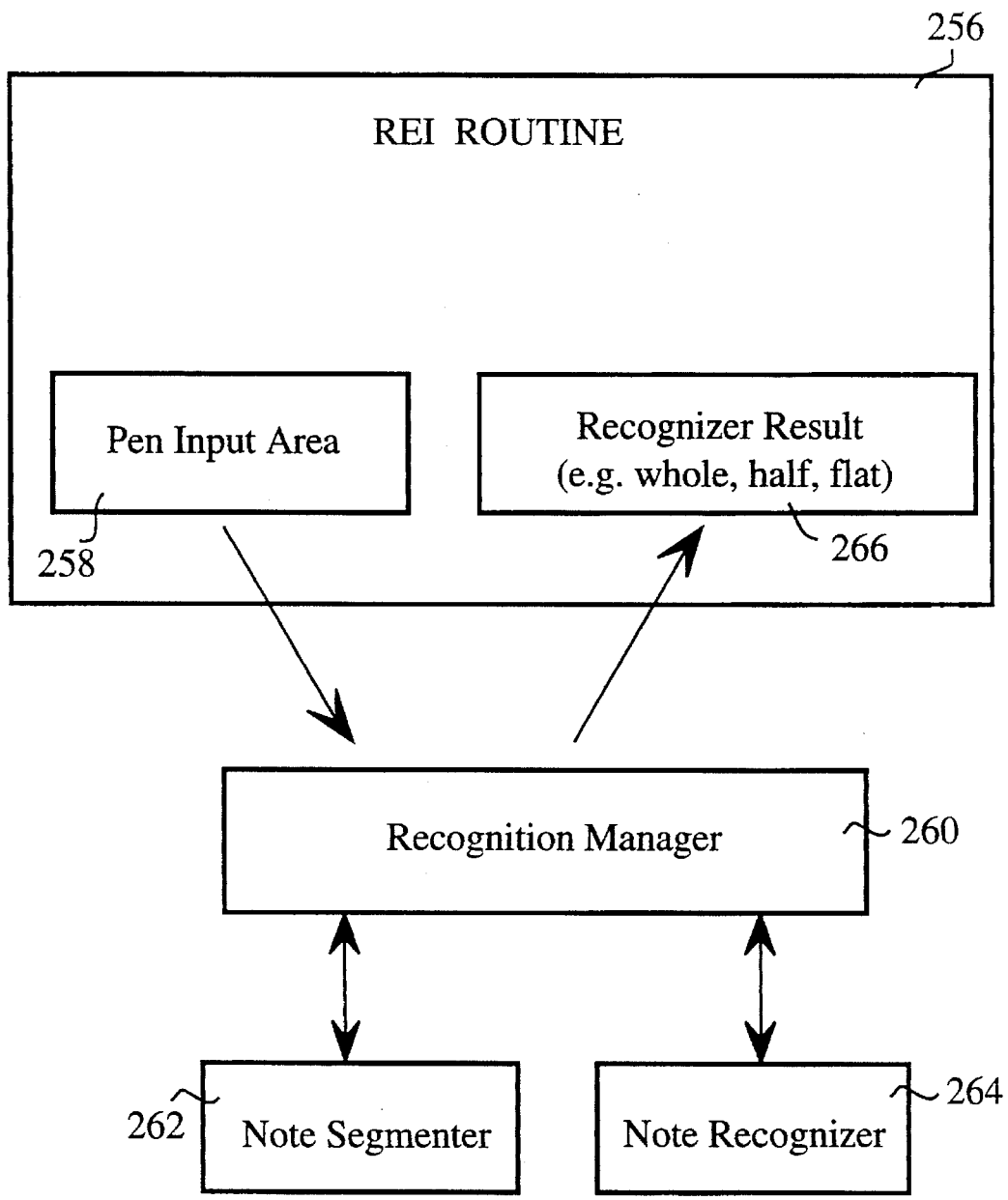
FIG. 16 is a system diagram used to described the process of FIG. 15.

FIG. 16 is used to explain the process 228 in greater detail. An REI routine 256 has a pen input or "recognition" area 258 wherein the user makes strokes with the stylus 38. These strokes are sent to a recognition manager 260 which communicates with a note segmenter 262 and a note recognizer 264. After the recognition routine has completed it recognition task, the recognition manager 260 sends back a token as indicated at 266. This result, e.g., whole note, half note, flat, is compared to the size and location of the original ink by the REI routine 256 to place the results at the correct location within the pen input or recognition area generated by the REI routine. This location information is then analyzed by the REI routine to determine whether the whole note that the user wrote is a D, a G, or a C. The result returned to the application will be a "Whole D-Note" token if the note was written on the 4th line of the treble staff. In this way, and REI routine may add additional information to the recognition output by providing context for the recognition results.

As an additional example, a Math REI routine may use a standard symbol recognizer which understands numerals and Greek letters. When the user writes "$X^2$" as in FIG. 5, the recognizer will return tokens for "X" and "2". The REI routine will then determine that since the "2" is written above the "X", and in a smaller font size, that the user meant "$X^2$" instead of "X2" in the equation.

Figure 17:
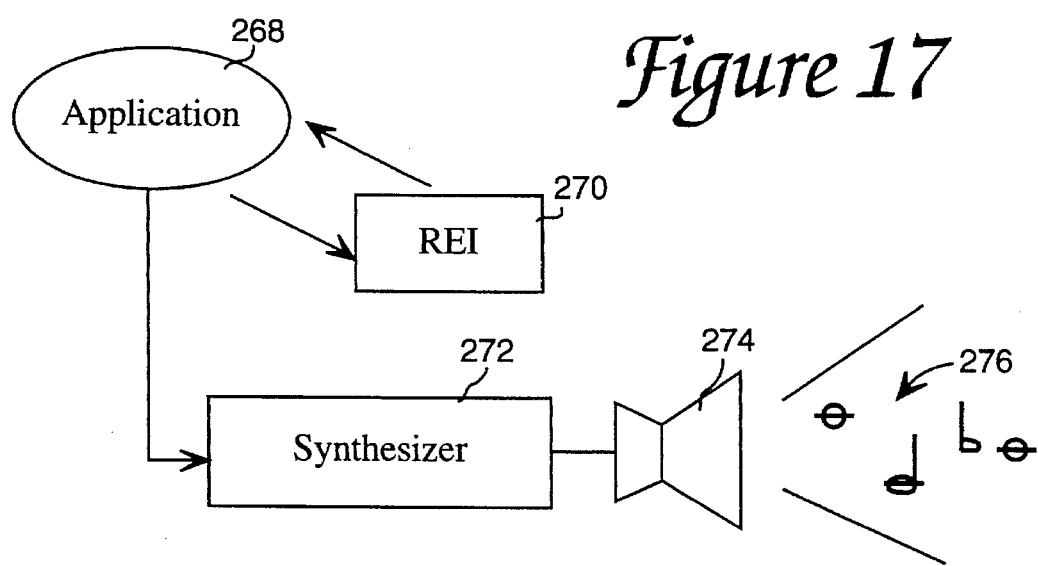
FIG. 17 is a system diagram used to explain the "Application Processes Contents" step 116 of FIG. 6.

FIG. 17 illustrates the "call REI get contents routine step 114" and the "application processes content" step 116 of FIG. 6 in greater detail. In FIG. 17, application program 268 calls the REI routine 270, and the REI routine 270 sends the recognized and process contents to the application 268. The application 268 can then down load data to a music synthesizer 274 coupled to a loud speaker system 274 to produce the music 276 that was input and edited within the REI routine 270.

While this invention has be described in terms of several preferred embodiments, it is contemplated that those skilled in the art will, upon reading the preceding descriptions and studying the drawings, realize certain alterations, permutations, and equivalents of the described invention. It is therefore intended that the following appended claims be interpreted as including all such alterations, permutations, and equivalents as fall within the true spirit and scope of the present invention.

What is claimed is:

1. A computer implemented method for interfacing between an application program and a recognizer routine, each of which are implemented on a computer system, the method comprising the steps of:

displaying a recognition field in an interface area of a display screen of said computer system;

displaying a control field in said interface area;

receiving user inputs into an interface routine implemented on said computer system, said interface routine not integral to either said recognizer routine or an operating system for said computer system, said user inputs comprising inputs made from a pointing device interacting with said interface area;

analyzing said user inputs made from said pointing device interacting with said interface area;

editing said recognition field in said interface area, when appropriate, as determined by said analyzing step;

sending said user inputs to said recognizer routine, when appropriate, as determined by said analyzing step;

receiving a recognized object from said recognizer routine, said recognized object corresponding to at least one of said user inputs;

sending said recognized object to said application, when appropriate, as determined by said analyzing step.

2. A method as recited in claim 1 wherein said interface routine is one of a plurality of interface routine types, and wherein said recognizer routine is of the same type as said interface routine.

3. A method as recited in claim 2 further comprising a plurality of recognizer routines of said same type, wherein said interface routine sends said user inputs to at least one of said plurality of recognizer routines of said same type.

4. A method as recited in claim 1 further including the step of initializing said interface routine including selecting an interface type.

5. A method as recited in claim 4 wherein said interface types include a text type.

6. A method as recited in claim 5 wherein said interface types further include numeric, graphical, and musical.

7. A method as recited in claim 1 wherein said step of editing comprises at least one of deleting, adding, and changing said at least one recognition field.

8. A method as recited in claim 1 wherein said computer system is capable of utilizing dynamically linked libraries and said interface routine includes a dynamically linked interface library.

9. A computer system comprising:

a central processing unit (CPU);

screen means coupled to said CPU;

pointer means coupled to said CPU and operable to produce ink inputs on said screen;

means for providing an application running on said CPU;

means for recognizing said ink inputs; and interface means implemented on said computer system and not integral to either said means for recognizing said ink inputs or an operating system for said computer system, said interface means operative to display an interface image on said screen of said CPU, receive ink inputs made by said pointer means on a region of said screen defined by said interface image, perform an analysis of said ink inputs, allow editing of said ink input when determined appropriate by said analysis, send said ink inputs to said means for recognizing ink inputs when determined appropriate by said analysis, receive recognized objects from said means for recognizing ink inputs, and send recognized object to said means for providing an application.

10. A computer system as recited in claim 9 wherein said interface means is capable of adding contextually related information to a recognized object prior to sending said recognized object to said means for providing an application.

11. A computer system as recited in claim 9 wherein said means for providing an application running on said CPU comprises said operating system and an application program running under said operating system.

12. A computer system as recited in claim 11 wherein said means recognizing ink inputs comprises said operating system and a recognition routine running under said operating system.

13. A computer system as recited in claim 12 wherein said screen means comprises a dual function display including an output screen and an associated tablet.

14. A computer system as recited in claim 13 wherein said pointer means comprises a stylus.

15. A computer system as recited in claim 14 wherein said interface means comprises an interface routine running under said operating system.

16. A computer system as recited in claim 15 wherein said interface routine is further operative to edit said recognized objects prior to sending said recognized objects to said application.

17. A computer system comprising:

a central processing unit (CPU);

a display screen assembly coupled to said CPU;

a pointer assembly coupled to said CPU that can make ink inputs;

a mass storage device coupled to said CPU;

a read only memory (ROM) device coupled to said CPU;

a random access memory (RAM) device coupled to said CPU;

an application program implemented on said computer system;

a recognizer routine implemented on said computer system; and a recognition editor and interface (REI) routine implemented on said computer system which provides an interface between said application program and said recognizer routine, displays an interlace image on said screen assembly, receives inputs from said pointing assembly, sends inputs to said recognition routine, receives recognized inputs from said recognition routine, and sends recognized inputs to said application program, said REI implemented as a dynamically linked library, said REI not integral to either said recognizer routine or an operating system for said computer system.

18. A computer system as recited in claim 17 wherein said display screen assembly comprises a dual function assembly including a display screen and an associated tablet responsive to a position of said pointer assembly.

19. A computer system as recited in claim 18 wherein said pointer assembly comprises a stylus.

20. A computer system as recited in claim 17 wherein the REI routine is further operable to provide editing of the recognized inputs prior to sending the recognized inputs to the application program.

21. A computer system as recited in claim 17 wherein the REI routine is further operative to add contextual related information to a recognized input prior to sending said recognized input to the application program.

22. A computer implemented method for interfacing between an application program and a recognizer routine, each of which are implemented on a computer system, the method comprising the steps of:

displaying an interface area on a display screen coupled with said computer system;

receiving user inputs into an interface routine implemented as a dynamically linked library on said computer system, said interface routine not integral to either said recognizer routine or an operating system for said computer system, said user inputs including inputs made from a pointing device interacting with said interface area;

sending said user inputs to said recognizer routine;

receiving a recognized object from said recognizer routine, said recognized object corresponding to at least one of said user inputs; and sending said recognized object to said application program.

\* \* \* \* \*

UNITED STATES PATENT AND TRADEMARK OFFICE
CERTIFICATE OF CORRECTION

PATENT NO. : 5,566,248
DATED : October 15, '1996
INVENTOR(S) : Robert Ulrich

It is certified that error appears in the above-indentified patent and that said Letters Patent is hereby corrected as shown below:

Column 14, line 64, change "interlace" to --interface--

Signed and Sealed this

Twenty-eighth Day of January, 1997

Attest:

Attesting Officer

BRUCE LEHMAN

Commissioner of Patents and Trademarks